Oct. 7, 1958

M. KNOBEL 2,854,755

POWER DRIVEN MICROMETER

Filed Oct. 24, 1955

INVENTOR
MAX KNOBEL
BY J. Stanley Churchill
ATTORNEY

Oct. 7, 1958  M. KNOBEL  2,854,755
POWER DRIVEN MICROMETER
Filed Oct. 24, 1955  3 Sheets-Sheet 2

INVENTOR
MAX KNOBEL
BY J. Stanley Churchill
ATTORNEY

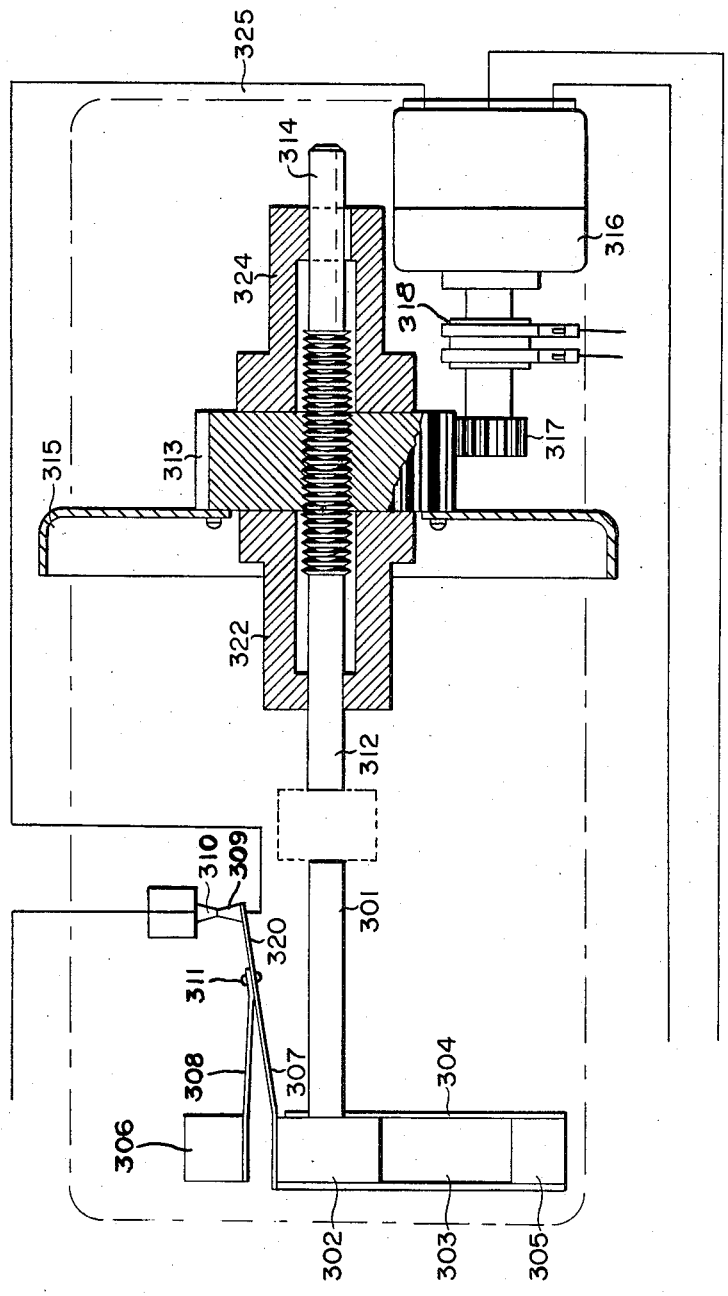

United States Patent Office 2,854,755
Patented Oct. 7, 1958

2,854,755

POWER DRIVEN MICROMETER

Max Knobel, Boston, Mass.

Application October 24, 1955, Serial No. 542,149

6 Claims. (Cl. 33—147)

This invention relates to a screw micrometer and more particularly to a power driven screw micrometer.

The invention has for an object to provide a novel and improved power driven screw micrometer having novel provision for effecting a preselected constant pressure against the part being measured whereby successive uniform and accurate readings of measurements may be consistently obtained.

The invention has for a further object to provide a novel and improved power driven screw micrometer having novel provision for limiting or regulating the force or pressure exerted against the part being measured and for automatically discontinuing the power driving means when a preselected constant pressure is reached whereby successive uniform and accurate readings of measurements may be consistently obtained.

With these general objects in view and such others as may hereinafter appear, the invention consists in the power driven screw micrometer hereinafter described and particularly defined in the claims at the end of this specification.

In the drawings illustrating the preferred embodiments of the invention:

Fig. 3 is a plan view of a modified form of the present power driven micrometer.

In general the present invention contemplates a power driven screw micrometer having a pair of relatively movable anvils between which the article to be measured is inserted to determine the dimension thereof and wherein provision is made for automatically limiting the force or pressure applied against the article by the anvils to the end that successive readings may be made when the anvils engage the article at a preselected constant pressure. In practice the force limiting or regulating device includes a resilient element arranged to yield when a preselected pressure is reached, and provision is made for discontinuing the power driving means in response to yielding of said resilient element, thereby assuring accurate and consistent successive or repeated uniform readings of the measurement of the article.

In one embodiment of the invention a stationary anvil is arranged to cooperate with a movable anvil provided with power driving means having resiliently connected coupling elements forming a force measuring system arranged to yield upon engagement of the movable anvil with the article and the stationary anvil at a predetermined pressure, the power driving means being automatically discontinued upon yielding and relative movement of the coupling elements.

In another embodiment of the invention the normally stationary anvil is resiliently mounted and is also provided with resilient elements operatively connected thereto forming with the resilient mounting a force measuring system arranged to yield when a predetermined pressure is brought to bear against the normally stationary anvil and to automatically discontinue the operation of the power driving means upon displacement of the normally stationary anvil.

The present power driven micrometer is preferably actuated by throwing a switch and operates automatically to provide a constant pressure against the article to be measured independently of the skill of the operator. The present micrometer operates relatively fast and is provided with a relatively large and easily read dial graduated for direct readings to 0.0001 of an inch and may be provided with a vernier to obtain readings to 0.00001 of an inch in a rapid and reliable manner. While the power driven micrometer herein illustrated in Figs. 1 and 2 is particularly adapted for measuring relatively thin sheet material, it will be obvious that the apparatus may be used to measure thicknesses of greater magnitude with anvils, such as shown in Fig. 3, which may be any distance apart.

Figure 1:
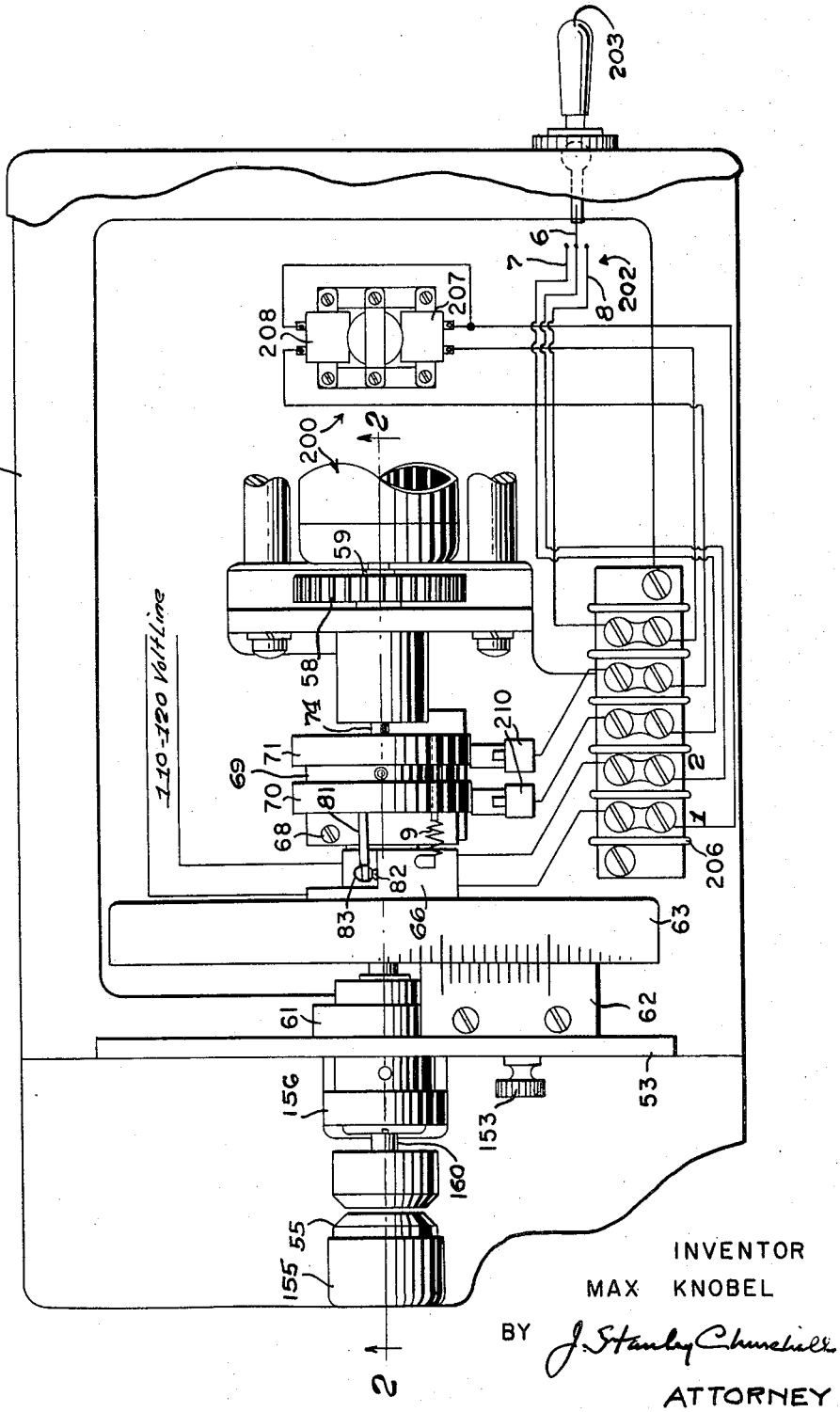
Fig. 1 is a plan view of the present power driven micrometer.
Figure 2:
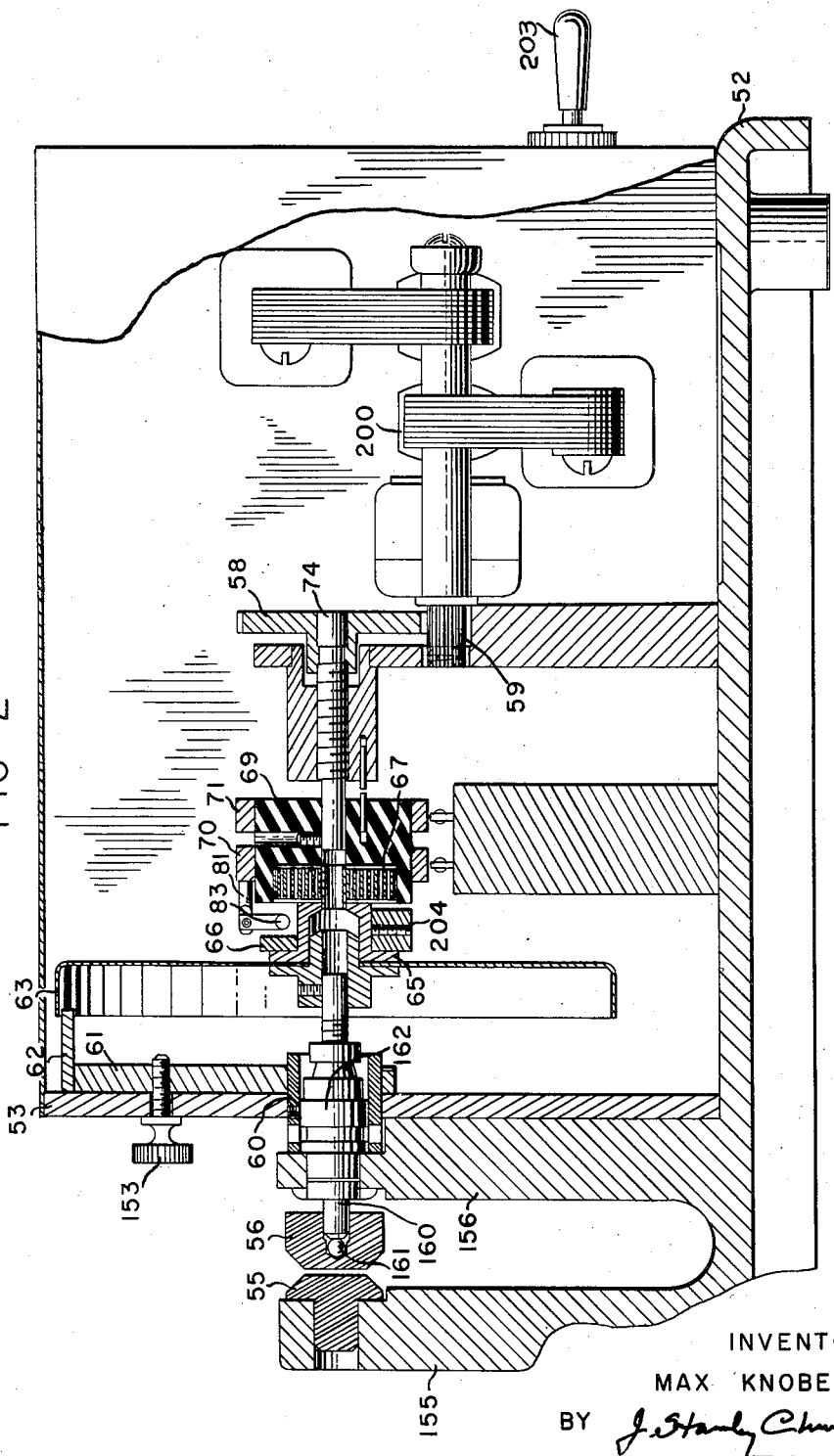
Fig. 2 is a side elevation partly in cross section as taken on the line 2—2 of Fig. 1.

Referring now to the drawings, in the embodiment of the invention illustrated in Figs. 1 and 2 the base 52 preferably comprises a fairly substantial casting, the anvil supports 155, 156 being formed integrally with the casting. The stationary anvil 55 is of hard material, and its face is preferably ground and lapped flat and perpendicular to its horizontal axis. The anvil 55 is firmly pressed into the anvil support 155 of the casting. Numeral 160 indicates the spindle of a precision screw micrometer, the female part 162 of the micrometer being mounted in the other support 156 of the base casting. The movable anvil 56 may also be hard and may be ground and lapped flat and perpendicular to its axial hole. The anvil 56 is free to turn on the micrometer spindle 160. A ball 161 is pressed into a suitable hole in anvil 56. The result of this anvil construction is that the flat anvil faces can completely align, due to the slight looseness of anvil 56, even if when manufactured their faces are not perfectly perpendicular to their axes. It also allows the anvils to close on a sheet without a twisting action due to the screw rotation. In a modified form of the invention the movable anvil may be secured on the spindle and might be preferable when measuring small parts.

Attached to the back end of the micrometer spindle 160 is a drum 63 of fairly large diameter but light in weight. If the screw pitch is .020 inch, the drum may be marked off in 200 divisions whereby each division is equivalent to .0001 inch axial movement of the spindle. A vernier scale 62 allows reading the scale to .00001 inch. This vernier scale is adjustable over a small range to allow resetting of the zero as may be required by temperature effects or wear. The vernier 62 is secured to an arm 61 pivoted about a collar 60 carried by a plate 53 attached to the anvil support 156, and the arm is locked in position by a screw 153 movable in a slot formed in the plate 53.

The drum and micrometer spindle assembly is rotated by a motor 200 through connections to be described. The motor 200 is preferably of the synchronous type to insure constant speed but may be any motor of reasonably constant speed. The motor is also reversible and controlled by a three-position switch 202. In operation when the switch handle 203 is horizontal, as shown, no power is supplied to the motor; when the switch handle is rocked up the motor rotates so as to back off the moving anvil; and when the handle is rocked down the motor drives the anvil forward to the sheet to be measured. The motor shaft carries a pinion 59 which drives a gear 58 secured to a shaft 74. This shaft 74 is provided with a screw thread of the same pitch as the micrometer screw; hence, on rotation both screws move axially but maintain the same separation.

On shaft 74 a commutator core 69 of insulating material carries two slip rings 70 and 71. A spring 67 of flat spring steel coiled in a helix is secured at its outer end to the core 69 by a screw 68 and at its inner end to an extension of a hub 65 which holds the drum. A ring of insulating material 66 adjustably secured on the hub 65 by a set screw 204 carries a contact pin 82. By a light coiled wire 9, contact 82 is connected to slip ring 71. A mating contact 83 on an arm 81 fixed to slip ring 70 is located to meet contact 82. If the set screw 204 holding ring 66 is loosened the drum can be rotated so as to wind up spring 67 to any given tension. On securing the set screw of ring 66 the spring will bring the contacts 82, 83 together under this set tension or force.

The wiring is as follows: The 110–120 v. line goes to terminals 1 and 2 of the terminal board 206. One side of the line, terminal 1, goes to one side of each of the two coils 207, 208 on the motor 200. The other side of the line, terminal 2, goes to the middle leaf 6 of the three position switch. On raising the switch handle, leaf 6 is connected to contact 8, and one coil of the motor is energized and rotation occurs to back off the anvil. On lowering the switch handle, leaf 6 is connected to contact 7 and hence through brushes 210 and slip rings 70, 71 and through contacts 82, 83 so as to energize the other coil of the motor and cause it to rotate in the direction to advance the anvil.

The operation is as follows: The anvils are opened to insert the sheet to be measured by raising switch handle 203. Note that contact 83 forces backward rotation of the micrometer spindle 160 by engagement with contact 82. On reversing rotation by throwing the switch handle down, the commutator and contact 83 move to give right hand (forward) rotation, and contact 82 stays against contact 83 by virtue of the spring 67. However, when the anvil closes on the sheet, the drum and micrometer spindle must stop, allowing contact 83 to move away from the now stalled contact 82. This immediately opens the motor circuit and stops it.

The spring 67 is adjustable at will to give any desired pressure at the anvils. I have found that the rotational driving speed should be fairly low to give best results, namely in the region of 5 to 10 R. P. M. This is not a restrictive range, but the reproducibility or consistency of repeated measurements becomes less at higher speeds and no gain is obtained by very low speeds. Just which speed is used in the above region is not critical, but it should always be the same in any one instrument, both to check the zero and to make the measurement.

With the combination of a constant drive speed, a fairly low speed and the constant torque provided by spring 67 together with means for automatically discontinuing the power when a preselected constant pressure is reached, I have found most remarkable reproducibility is possible. In practice, it is possible to reproduce readings consistently to 0.00001 inch, which is quite impossible with hand operation or with the ratchet devices commonly used on micrometers to help get more constant torque. It will be readily seen that no operator skill at all is involved in making measurements with the present micrometer.

Referring now to Fig. 3, a modified form of the invention contemplates a type of micrometer in which the normally fixed anvil is resiliently mounted and in effect measures the pressure exerted on the article being measured. Numeral 301 indicates the normally stationary anvil attached to a block 302 which in turn is supported by the free ends of two parallel steel spring straps 303, 304 secured at their fixed ends to a fixed block 305 providing a substantially straight line motion for the anvil 301 along its longitudinal axis when engaged by the movable anvil indicated at 312. Attached to block 302 and a fixed block 306 respectively are two spring reeds 307, 308 which are joined together at 311. With a relatively small lateral spacing between the movable block 302 and the fixed block 306 a relatively small longitudinal movement of block 302 causes a much larger motion of an extended end 320 of the spring reed 307, thus forming in effect a force measuring system.

The movable anvil or spindle 312 shown in the modified form of the invention is arranged to be moved axially when a barrel or nut 313 is rotated, the nut being restrained from longitudinal movement by bearing members 322, 324 forming a part of the frame. The spindle 312 is held from rotating by a key 314 carried by the bearing member 324 and cooperating with a keyway formed in the spindle. The dial 315 with its graduated scale is attached to the nut 313.

A reversible driving motor 316 is provided with a pinion 317 which meshes with gear teeth formed on the nut 313 to rotate the nut. The motor circuit 325 in the modified form of the invention includes a stationary contact 310 and a movable contact 309 carried by the extended portion 320 of the spring reed 307. The contacts 309, 310 are normally closed and are arranged to be opened when a preselected pressure is exerted against the article being measured, the spring reeds being preset to effect movement of contact 309 at a predetermined force or pressure. The circuit may also include switching mechanism similar to that shown in Fig. 1 to effect reversal of the motor. Preferably, the power driving means may comprise a two-speed motor so that the micrometer spindle 312 may be moved relatively fast when adjusting the mechanism from a position for measuring a small article to a position for measuring a larger article, the measuring operation preferably being performed at a relatively slow speed.

The driving connections between the motor 316 and the nut 313 may also include an electromagnetic clutch indicated generally at 318 which may also be deenergized when the circuit is opened at contacts 309, 310. The use of an electromagnetic clutch is of particular advantage to effect fast stopping of the drive when the preselected pressure is reached.

While the preferred embodiments of the invention has been herein illustrated and described, it will be understood that the invention may be embodied in other forms within the scope of the following claims.

Having thus described the invention, what is claimed is:

1. In a power driven micrometer, in combination, a pair of relatively movable anvils between which the article to be measured is inserted, one of said anvils being resiliently mounted and forming in effect a force measuring element, power driving means for effecting relative movement of said anvils, said resiliently mounted anvil being preset to yield when the anvils engage the article being measured at a preselected constant pressure, and means responsive to the yielding of said resiliently mounted anvil for discontinuing the power driving means when said preselected constant pressure is reached.

2. A power driven micrometer as defined in claim 1 wherein the power driving means includes a relatively constant speed motor operated at a relatively low speed.

3. In a power driven micrometer, in combination, a normally stationary resiliently mounted anvil and a movable anvil between which the article to be measured is inserted, power driving means for said movable anvil, said resiliently mounted anvil being adapted to yield upon engagement of the power driven anvil with the article at a preselected constant pressure and forming in effect a force measuring device, and means operatively connected to said resiliently mounted anvil for discontinuing the operation of said power driving means when said preselected constant pressure is reached.

4. In a power driven screw micrometer, in combination, a normally stationary anvil having a resilient mounting, and a movable anvil between which the article to be measured is inserted, power driving means for said movable anvil including an electric motor and a circuit for said motor, a resilient contact unit operatively connected to said resiliently mounted anvil and forming therewith a force measuring system adapted to yield when a predetermined constant pressure is reached upon engagement of the power driven anvil with the article, said contact unit including a pair of normally closed contacts in said circuit arranged to be opened to discontinue the operation of the motor when said predetermined pressure is reached whereby to enable consistently uniform repeated measurements of an article to be obtained.

5. A power driven screw micrometer as defined in claim 4 wherein the electric motor comprises a two-speed reversible motor.

6. A power driven screw micrometer as defined in claim 4 wherein the power driving means also includes an electromagnetic clutch operatively connected in said circuit and adapted to be deenergized upon opening of said contacts to discontinue the drive.

References Cited in the file of this patent

UNITED STATES PATENTS

| | | |
|---|---|---|
| 2,290,940 | Carson | July 28, 1942 |
| 2,294,831 | Carson | Sept. 1, 1942 |
| 2,624,121 | Knobel | Jan. 6, 1953 |
| 2,624,122 | Knobel | Jan. 6, 1953 |

FOREIGN PATENTS

| | | |
|---|---|---|
| 53,739 | Denmark | Oct. 18, 1937 |